3,236,892
SUBSTITUTED PHENYLALKANOLAMINES
Francis J. Petracek, Canoga Park, Calif., assignor to Rexall Drug and Chemical Company, Los Angeles, Calif., a corporation of Delaware
No Drawing. Filed Mar. 25, 1963, Ser. No. 267,802
2 Claims. (Cl. 260—570.6)

This invention relates to compounds classified in the art of chemistry as substituted phenylalkanolamines.

In particular, the invention sought to be patented resides in the concept of chemical compounds having the formula:

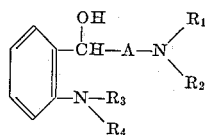

wherein A is lower alkylene containing 1 to 2 carbon atoms in the alkylene chain, $R_1$ and $R_2$ are hydrogen, lower alkyl or when taken with the amino nitrogen atom form a 5 to 6 membered heterocyclic ring, and $R_3$ and $R_4$ are hydrogen, lower alkyl or phenyl-lower alkyl, and the non-toxic pharmaceutically acceptable acid addition and quaternary ammonium salts thereof.

As used throughout the specification and in the claims the term "5 to 6 membered heterocyclic ring" embraces monocyclic rings linked to the alkylene chain of the compounds sought to be patented by a nitrogen atom, including, for example, piperidino, pyrrolidino, piperazino, morpholino, thiomorpholino and the like; the term "lower alkyl" embraces straight and branched chain alkyl groups containing 1 to 6 carbon atoms; the term "lower alkylene" embraces straight and branched chain alkylene groups containing 1 to 6 carbon atoms; and the term "lower alkoxy" embraces straight and branched chain alkoxy groups containing 1 to 6 carbon atoms.

The tangible embodiments of this invention possess the inherent general physical characteristics of being, in the form of their acid addition salts, white crystalline solids. Spectral data reveal no unsaturation except as present in the benzene ring. The aforementioned physical characteristics, taken together with the nature of the starting materials and the mode of synthesis, positively confirm the structure of the compounds sought to be patented.

The tangible embodiments of this invention possess the inherent applied use characteristics of having significant pharmacological activity as anticonvulsant, diuretic and central nervous system depressant agents as determined by recognized and accepted pharmacological test procedures. In addition, the tangible embodiments of this invention are valuable chemical intermediates useful in synthetic procedures well-known in organic chemistry. For example, these compounds have a free hydroxyl group and thus are susceptible to the reactions of this group, such as ester formation.

The manner and process of making and using the compounds of this invention will now be generally described so as to enable a person skilled in the art of chemistry to make and use the same as follows:

The tangible embodiments of this invention are prepared by various synthetic pathways, depending upon the nature of the alkylene chain (—A—) and the substituents on the amino nitrogen atoms as follows:

METHOD A

The starting materials are compounds of the formula

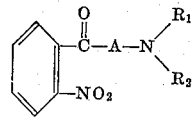

where A, $R_1$ and $R_2$ are described above and may be prepared as described in Z. Naturforsch., 8b, 454–462 (1953). Treatment of such starting materials with an alkali metal borohydride reducing agent yields compounds of the formula

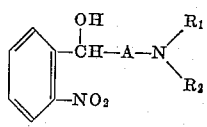

which upon catalytic hydrogenation in the presence of Raney nickel or palladium yields compounds of this invention of the formula

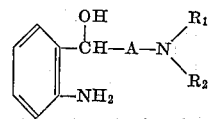

In the specific case of compounds wherein $R_1$ and $R_2$ are both hydrogen, the amino nitrogen atom of the starting material is protected as a phthalimido group:

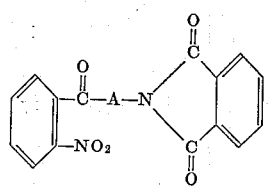

as described in the aforementioned Z. Naturforsch. paper. Treatment of the above compounds with an alkali metal borohydride followed by treatment with hydrazine in the presence of Raney nickel or palladium yields compounds of this invention of the formula

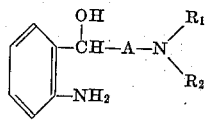

in which $R_1$ and $R_2$ are hydrogen.

The aforementioned compounds of this invention bearing a free amino group on the benzene ring may be treated in accordance with conventional procedures for converting primary amines to secondary and tertiary amines to form compounds of this invention of the formula

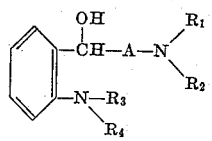

in which $R_3$ and $R_4$ are lower alkyl or phenyl-lower alkyl.

METHOD B

The starting materials are compounds of the formula

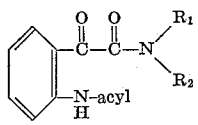

in which $R_1$ and $R_2$ are hydrogen, lower alkyl or when taken with the amino nitrogen atom form a 5 to 6 membered heterocyclic ring and "acyl" refers to the acyl radical of an alkyl carboxylic acid containing 2 to 6 carbon atoms, benzoyl or benzoyl linked to the nitrogen atom by an alkylene chain of 1 to 5 carbon atoms. Such starting materials may be prepared as described in J. Chem. Soc., 1957, 3470.

Treatment of the above described starting materials with an alkali metal aluminohydride yields compounds of this invention of the formula

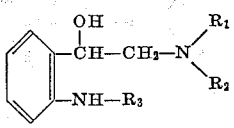

in which $R_3$ is an alkyl group of 2 to 6 carbon atoms or phenyl-lower alkyl.

METHOD C

In this method is adapted to the preparation of the compounds of this invention of the formula

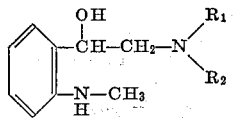

the starting material is isatin which is treated by the following reaction sequence:

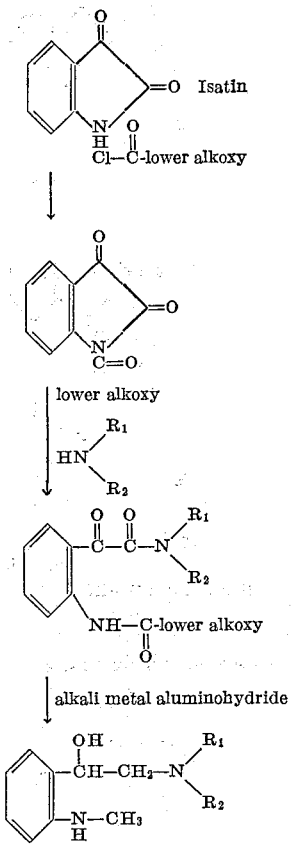

The tangible embodiments of this invention can, if desired, be converted into their non-toxic pharmaceutically acceptable acid addition and quaternary ammonium salts by conventional means. Typical acid addition salts include the hydrochloride, hydrobromide, citrate, maleate, sulfate, nitrate and the like. Typical quaternary ammonium salts are those formed with such alkyl halides as methyl iodide, ethyl bromide, n-hexyl bromide and the like.

The tangible embodiments of this invention, either as the free base or in the form of a non-toxic pharmaceutically acceptable acid-addition or quaternary ammonium salt, may be combined with conventional diluents and carriers, to form dosage forms such as tablets, capsules, solutions, suspensions, suppositories and the like.

The best mode contemplated by the inventor for carrying out this invention will now be set forth as follows:

*Example 1.—1-(o-ethylaminophenyl)-2-aminoethanol*

Lithium aluminum hydride (51.9 g., 0.36 mole) is stirred for 3 hours in 600 ml. of anhydrous ether. o-Acetamidophenylglyoxylic acid amide (93.5 g., 0.455 mole) in 1500 ml. of tetrahydrofuran is slowly added with cooling. After addition the mixture is refluxed overnight and then cooled. Cold isopropanol (420 ml.) and then 340 ml. of saturated sodium chloride solution are added. The mixture is filtered, washed three times with tetrahydrofuran, dried over anhydrous magnesium sulfate and the solids recovered by evaporation of the solution under reduced pressure followed by recrystallization from benzene. Yield 34 g. (43%), 104–105.5° C.

*Analysis.*—Calculated for $C_{10}H_{16}ON_2$: C, 66.63%; H, 8.95%; N, 15.54%. Found: C, 66.56%; H, 8.97%; N, 15.25%.

The following examples illustrate the preparation of other tangible embodiments of this invention and are included for purposes of illustration:

*Example 2.—1-(o-ethylaminophenyl)-2-methylaminoethanol* o-Acetamidophenylglyoxylic acid N-methylamide (93 g., 0.425 mole) is treated with lithium aluminum hydride (48.5 g., 0.275 mole) as described in Example 1 to yield 17 g. (38%) of 1-(o-ethylaminophenyl)-2-methylaminoethanol, M.P. 116–117° C.

*Analysis.*—Calculated for $C_{11}H_{18}ON_2$: C, 68.00%; H, 9.34%; N, 14.42%. Found: C, 67.73%; H, 9.00%; N, 14.41%.

*Example 3.—1-(o-ethylaminophenyl)-2-dimethylaminoethanol* o-Acetamidophenylglyoxylic acid N,N-dimethylamide (105 g., 0.45 mole) is treated with lithium aluminum hydride (51.25 g., 1.35 moles) as described in Example 1 to yield 51 g. (55%) of 1-(o-ethylaminophenyl)-2-dimethylaminoethanol, B.P. 112–114° C. at 0.5 mm. Hg.

*Analysis.*—Calculated for $C_{12}H_{20}N_2O$: C, 69.19%; H, 9.68%; N, 13.45%. Found: C, 68.92%; H, 9.40%; N, 13.65%.

*Example 4.—1-(o-ethylaminophenyl)-2-piperidinoethanol* o-Acetamidophenylglyoxylic acid piperidide (100 g. 0.365 mole) in 500 ml. tetrahydrofuran is reduced with lithium aluminum hydride (55.5 g., 1.46 moles) in ether as described in Example 1 to yield 60 g. (66%) of 1-(o-ethylaminophenyl-2-piperidinoethanol, B.P. 155–160° C. at 1 mm. Hg.

*Analysis.*—Calculated for $C_{15}H_{23}N_2O$: C, 72.54%; H, 9.74%; N, 11.28%. Found: C, 72.01%; H, 9.31%; N, 11.20%.

*Example 5.—1-(o-methylaminophenyl)-2-dimethylaminoethanol* o-(Carbethoxyamino)-phenylglyoxylic acid dimethylamide (75 g., 0.3 mole) is reduced with lithium aluminum hydride (33 g., 0.87 mole) in ether as described in Example 1 to yield 21 g. (33%) 1-(o-methylaminophenyl)-2-dimethylaminoethanol, B.P. 131–133° C. at 2 mm. Hg.

*Analysis.*—Calculated for $C_{11}H_{18}N_2O$: C, 68.00%; H, 9.34%; N, 14.2%. Found: C, 68.04%; H, 9.31%; N, 14.31%.

*Example 6.—1-(o-benzylamino-phenyl)-2-aminoethanol* o-(Benzamidophenyl)-glyoxylic acid amide is reduced with lithium aluminum hydride as described in Example 1 to yield 1-(o-benzylaminophenyl)-2-aminoethanol.

The subject matter which the applicant regards as his invention is particularly pointed out and distinctly claimed as follows:

1. A member selected from the group consisting of compounds of the formula

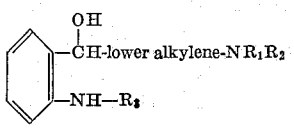

wherein $NR_1R_2$ is a member selected from the group consisting of amino, di-lower alkylamino, piperidino, pyrrolidino, piperazino, morpholino and thiomorpholino and $R_3$ is phenyl-lower alkyl, and the pharmaceutically acceptable non-toxic acid addition and alkyl halide quaternary ammonium salts thereof.

2. 1-(o-benzylaminophenyl-2-aminoethanol.

References Cited by the Examiner

UNITED STATES PATENTS

| 1,898,258 | 2/1933 | Oberlin | 260—570.6 |
| 2,946,793 | 7/1960 | Michaels et al. | 260—294.7 X |
| 3,056,797 | 10/1962 | Shapiro et al. | 260—294.7 |

OTHER REFERENCES

Gaylord, Reduction With Complex Metal Hydrides, Chapter 10 (note page 544), Interscience Pub. Inc., New York, 1956. Lands, Jour. Pharmacol. Exptl. Therap., vol. 104, pp. 474–7 (1952).

Wright et al., J. Org. Chem., volume 24, page 265 (1959).

WALTER A. MODANCE, *Primary Examiner.*

NICHOLAS S. RIZZO, *Examiner.*